United States Patent
Blakley et al.

(10) Patent No.: US 6,796,172 B2
(45) Date of Patent: Sep. 28, 2004

(54) FLOW SENSOR

(75) Inventors: Daniel R. Blakley, Philomath, OR (US); John M. Koegler, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 10/210,546

(22) Filed: Jul. 31, 2002

(65) Prior Publication Data

US 2004/0020286 A1 Feb. 5, 2004

(51) Int. Cl.$^7$ ............................................... G01F 1/68
(52) U.S. Cl. ................................................. 73/204.26
(58) Field of Search ...................... 73/204.26, 204.25, 73/204.24

(56) References Cited

U.S. PATENT DOCUMENTS

| | | | |
|---|---|---|---|
| 4,542,650 A | * | 9/1985 | Renken et al. ............... 73/196 |
| 4,776,214 A | | 10/1988 | Moran et al. |
| 4,969,357 A | | 11/1990 | Mickler |
| 5,035,138 A | | 7/1991 | Abdel-Rahman |
| 5,108,193 A | | 4/1992 | Furubayashi |
| 5,209,111 A | | 5/1993 | Agarwal et al. |
| 5,237,866 A | | 8/1993 | Nijdam |
| 5,372,040 A | * | 12/1994 | Hecht et al. ............... 73/204.26 |
| 5,415,029 A | | 5/1995 | Uchiyama et al. |
| 5,511,415 A | | 4/1996 | Nair et al. |
| 5,515,295 A | | 5/1996 | Wang |
| 5,524,084 A | | 6/1996 | Wang et al. |
| 5,726,357 A | * | 3/1998 | Manaka ................... 73/204.26 |
| 5,780,736 A | | 7/1998 | Russell |
| 5,869,758 A | | 2/1999 | Huiberts |
| 5,929,333 A | | 7/1999 | Nair |
| 5,952,571 A | | 9/1999 | Arai et al. |
| 6,629,456 B2 | * | 10/2003 | Kohno ..................... 73/204.26 |

* cited by examiner

*Primary Examiner*—Edward Lefkowitz
*Assistant Examiner*—Jewel V. Thompson

(57) ABSTRACT

A flow sensor system is provided for measuring the rate of flow of a fluid in a flow channel that is configured to contain the flow. A substrate may be disposed in the flow channel, and a plurality of transducers may be disposed on the substrate in the flow channel. The substrate may also provide a plurality of paths, and each path may conduct a signal. The transducers may be configured to respond to the fluid flow by modifying the signals in relation to the flow. The transducers may be arranged with at least one of the transducers disposed closer to a central longitudinal axis of the flow channel than at least one other transducer. A signal processor may be coupled to at least two of the signals, and the signal processor may calculate the rate of flow of the fluid as a function of the at least two signals.

47 Claims, 3 Drawing Sheets

FLOW SENSOR

BACKGROUND

A flow rate of a fluid flowing within a channel may be determined by placing a detector in the channel, heating the detector to a temperature above ambient, and measuring the extent to which heat is carried away from the detector by the fluid flowing past the detector. As the fluid flow rate increases, the amount of heat carried away increases, and the detector varies, e.g. in electrical resistance, in accordance with its temperature, thereby providing information about the heat carried away, and thus the fluid flow rate.

A heating element may heat the detector above ambient, and then, a small sensing current may be sent through the detector to measure its resistance during fluid flow. Alternatively, the sensing current may be large enough to heat the detector above ambient. In either case fluid flow may be calculated from the resistance of the detector, e.g., by placing the detector in a leg of a Wheatstone bridge circuit and measuring the output of the circuit to determine resistance and fluid flow.

Fluid flow sensors that include a detector heated above ambient typically are referred to as hot wire sensors. Some sensors of this type literally include a "hot wire" (e.g. a platinum wire) suspended in the fluid flow channel for use as a detector. A thermal-sensitive resistive element deposited on a silicon substrate may also be used as a detector. Alternatively, a transistor or other element with a thermal-sensitive property, or other property for sensing fluid flow, similarly may be used.

As will be appreciated, the accuracy and response time of a thermal-sensitive element on a substrate typically depends in part on the thermal coupling between the element and the substrate. This is the case because the substrate may sink heat away from, or add heat to the thermal-sensitive element, depending on the substrate temperature. Substrate temperature, in turn, typically depends on other elements on the substrate, and/or on thermal coupling of the substrate to other devices (such as the hardware mounting of the substrate in the channel). In either case, the substrate typically provides a thermal mass much larger than that of the thermal-sensitive element, and thus tends to slow the response of the thermal-sensitive element to changes in fluid flow.

Furthermore, it will be understood that a hot wire sensor typically senses fluid flow at a particular position in the flow channel, or in the case of an actual wire, along a line defined across the flow channel. The sensor or wire then may provide a single data point, which is used to calculate the flow rate for the entire channel. Unfortunately, hot wire sensors may include inherent inaccuracies, such as non-linear dependence on temperature, process variations between hot wire sensors of the same type, and/or degradation due to aging or contaminant deposits. Furthermore, flow rate typically varies across the flow channel, remaining at zero within a boundary layer that forms at the wall of the channel and reaching a maximum in the free stream that is closer to the center of the flow channel. Accuracy of the calculated flow rate thus depends on the accuracy of the sensor, and also on the extent to which the particular position of the hot wire sensor represents fluid flow in the channel as a whole. Also, for an actual "hot wire," accuracy depends on the extent to which the wire is accurate in lumping a distributed measurement into a single data point.

Another limitation of hot wire sensors is that such sensors typically do not provide information about the direction of fluid flow in a channel. That is, a hot wire sensor is equally cooled by fluid flow in one direction through the channel as it is by fluid flow in the opposite direction. Fluid flow that alternates back and forth thus would typically result in a report of fluid flow in absolute terms rather than as an algebraic sum more representative of average fluid flow.

SUMMARY

A flow sensor system is provided for measuring the rate of flow of a fluid in a flow channel that is configured to contain the fluid flow. A substrate may be disposed in the flow channel, and a plurality of transducers may be disposed on the substrate in the flow channel. The substrate may also provide a plurality of paths, and each path may conduct a signal. The transducers may be configured to respond to the fluid flow by modifying the signals in relation to the fluid flow. The transducers may be arranged with at least one of the transducers disposed closer to a central longitudinal axis of the flow channel than at least one other transducer. A signal processor may be coupled to at least two of the signals, and the signal processor may calculate the rate of flow of the fluid as a function of the at least two signals.

DETAILED DESCRIPTION

Figure 1:
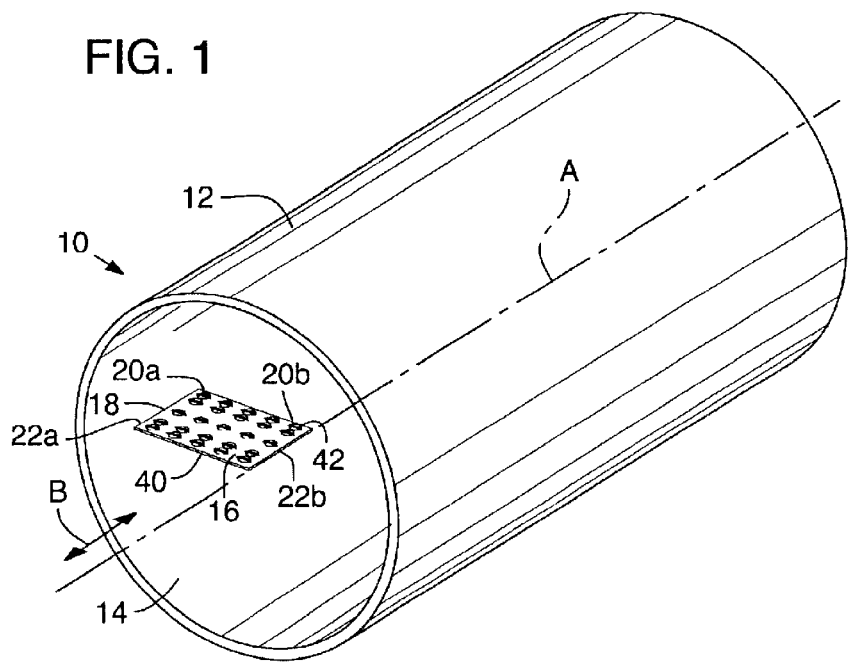
FIG. 1 is a cross-sectional isometric view of a fluid channel with a flow sensor system including a detector array arranged on a surface of a substrate that is generally parallel with a direction of fluid flow within the channel in accordance with an embodiment of the invention.

As shown in FIG. 1, a flow sensor system is shown generally at 10 in accordance with an embodiment of the present invention. Flow sensor system includes a flow channel 12, which typically defines a central longitudinal axis A within which a fluid flows in either of two directions indicated by double-headed arrow B. Although the depicted flow channel is generally circular in cross-section, it is to be appreciated that the channel may be of virtually any cross-section, including, without limitation, square, rectangular, oval, or irregular shape. The flow channel also may be of virtually any length, and may be made of any suitable material for use in transporting the fluid as described herein.

The referenced fluid may be any liquid or gas, or combination thereof, with or without suspended or otherwise co-transported solids. During fluid flow, the fluid may contact an inner wall 14 of flow channel 12, and the friction between the fluid and inner wall 14 may be such that an observable boundary effect slows the fluid within a boundary region to a boundary flow rate. Fluid flow within the boundary region thus is typically less than a free stream flow rate that occurs in a free stream region closer to the central axis of the fluid channel. The total flow of fluid in the channel thus may be considered to include fluid flowing at both the boundary flow rate and the free stream flow rate.

The boundary flow typically varies in rate from zero at inner wall 14 to the free stream flow rate adjacent the transition between the boundary region and the free stream region. The tree stream flow typically flows at a single rate—no cross-sectional portion of the free stream flow is flowing at a substantially different rate than another portion. However, the location of the transition between the boundary region and the free stream region may vary over time, temperature, flow rate, fluid viscosity, and other variables. Furthermore, depending on channel size and shape and the fluid's parameters, the free stream flow might not be flowing at a single rate. Typically under such a condition, the flow rate increases roughly parabolically, as measured starting at any point at the channel wall and moving radially toward the channel axis. Typically, this is particularly true further down the channel, while at the beginning of the channel the flow profile typically is flat in the center of the channel, thus tending toward the single flow rate in the free stream in the center of the channel, as described above. In any case, the flow profile, for a channel exhibiting axial symmetry, tends likewise to exhibit axial symmetry.

As will be apparent upon close review of the drawings, flow sensor system may include a detector array 16 disposed within channel 12. Detector array 16 may be formed on a base, typically a thin, monolithic semiconductor substrate such as that shown at 18. Accordingly, detectors 20 in the form of thermal-sensitive elements may be deposited or grown through any of a variety of integrated-circuit manufacturing techniques that reliably produce elements of constant geometry and parameters. This is desirable because each element in an array of elements of constant geometry and parameters will tend to dissipate heat and reflect that dissipation in a changing resistance or other parameter in a uniform or nearly uniform manner compared to the other elements in the array. Thus, signal processing of the signals from the array of elements can assume that the signal from each element is roughly as accurate a measure of the fluid flow at the element's locations as the measure of another element at that element's location. Therefore, signal processing, for example, averaging the signal of several spatially-separated elements to approximate the average fluid flow past those elements, can be performed with an expectation of producing a more accurate representation of the fluid flow than can be produced by any single sensor element. Such averaging, as used herein, may include weighted sampling of the signal in accordance with acceptable signal processing techniques.

As noted above, the flow within a channel tends to have a varying profile, typically increasing from zero or close to zero as measured adjacent the channel wall, toward a maximum at the channel axis. Elements along the varying profile will sense and reflect that varying profile instead of a single approximation or lumping of the distributed flow into a single data point. The spatially separated elements thus provide input data that allows a variety of signal processing techniques to be used to calculate more accurately the total fluid flow in the channel.

The detectors may be distributed across such a substrate (or alternatively, on a printed circuit board or other base for electronic circuitry), and may be readily interconnected with the control circuitry which provides heating current to the detectors and processing circuitry which measures detector voltage, and processes the resulting measurement signals to calculate the fluid flow rate.

Figure 2:
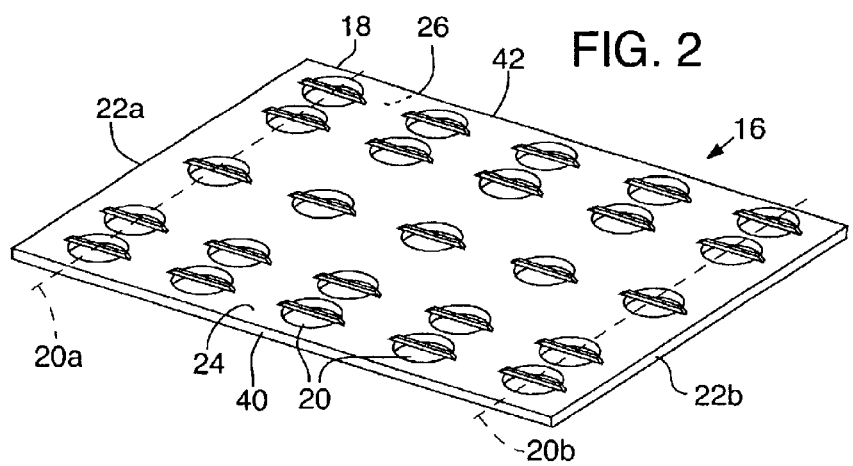
FIG. 2 is an enlarged isometric view of the detector array of FIG. 1.
Figure 5:
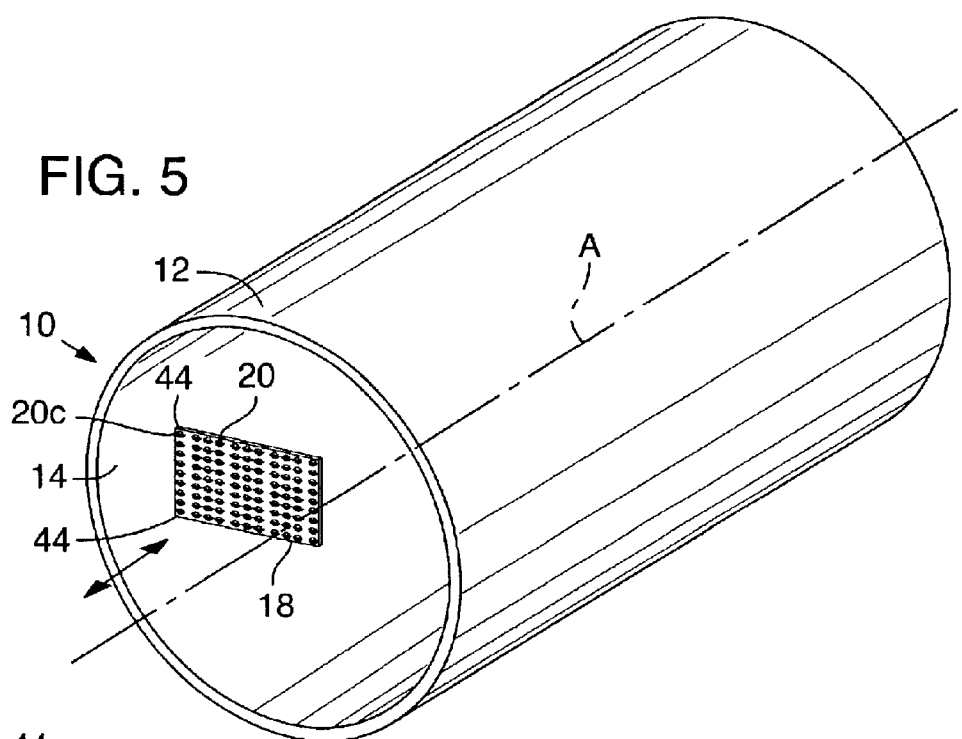
FIG. 5 is a cross-sectional isometric view of a fluid channel with a flow sensor system including a detector array arranged on a surface of a substrate that is generally perpendicular to a direction of fluid flow within the channel in accordance with yet another embodiment of the invention.

Referring now to FIGS. 1 and 2, it will be noted that base 18 typically includes a first side edge 22a positioned within the boundary region adjacent inner wall 14. A second side edge 22b typically is positioned within the free stream region adjacent central axis A. Detectors 20 typically are disposed on a first, generally planar surface 24 of base 20, generally extending from adjacent inner wall 14 to within the free stream region. It will be appreciated, however, that such detectors may similarly be disposed on a second, opposite, generally planar surface 26 without substantial effect on the operation as described herein. Furthermore, although FIGS. 1 and 5 show detectors that are arrayed from roughly at the channel wall out to the central axis A of the fluid channel, the detectors could alternatively extend from side to side of the channel, that is from adjacent one point on the channel wall, across the central axis, to an opposite point on the channel wall. However, the embodiment where the array extends out to the central axis only takes advantage of the axial symmetry of the flow profile. That is, for the axially symmetric channel, the flow rate will be the same at two points on opposite sides of central axis A, when both are the same radial distance, r, from the central axis. Therefore, the array that extends from the side wall to the central axis may be used to characterize the flow profile for the entire channel and calculate total fluid flow based on axial symmetry of the flow profile.

The detectors may be arranged to form a plurality of rows (e.g., 20a, 20b) extending generally along a flow path indicated by double-headed arrow B. Detectors adjacent inner wall 14, for example, form a first edge row 20a along first side edge 22a. The detectors of first edge row 20a typically are small enough and disposed sufficiently close to inner wall 14 that such detectors are within a portion of the boundary region where the boundary fluid flow rate is effectively zero. These detectors thus may be used as a reference row. Alternatively, a set of one or more detectors may be covered with a conformal coating, or otherwise insulated from the fluid flow so that heat will not be substantially removed from these sensors by the fluid flow.

Detectors adjacent central axis A form a second edge row 20b along second side edge 22b. The detectors of second edge row 20b thus typically are arranged in a line corresponding to nominal fluid flow within the free stream region where the fluid flow rate is effectively the free stream fluid flow rate. Further rows of detectors between the first edge row and the second edge row typically define a continuum of fluid flow rates between zero and the free stream fluid flow rate. The number of rows and the exact arrangement may be varied to best measure the fluid flow rate in all portions of the fluid channel for a particular application. The greater the number of rows, the greater the precision with which the sensor system may measure and characterize the rate of flow in the boundary region and in the free stream region.

In the depicted configuration, heat may flow downstream from detector to detector along each row of the detector array (to the extent that upstream detectors will transmit heat via the fluid to downstream detectors given the heat transmissive properties of the fluid). This, in turn, may cause detectors in a given row to demonstrate differential heat-dissipative effect (as identified by differential temperatures of the detectors progressing downstream). Accordingly, by comparing temperatures of the detectors along a row, flow direction may be determined within the fluid channel by identifying a direction of increasing detector temperature. In general, the downstream detectors in a row, if sufficiently closely spaced, will exhibit a higher temperature than the leading detector in the same row.

In view of the above-described arrangement, it will be understood that detectors 20 are typically thermal-sensitive elements that measure a temperature change from an induced temperature above ambient to one reduced by the carrying away of heat from the detector by the fluid flow. However, any detector suitable for disposition within the channel to detect temperature may be used. Furthermore, it is to be understood that the depicted exemplary detectors are larger than typical size relative to the channel, for improved clarity in the drawings. Typically, a channel will have room for a larger number of detector rows between the inner wall and the central axis as compared to what is depicted.

Figure 3:
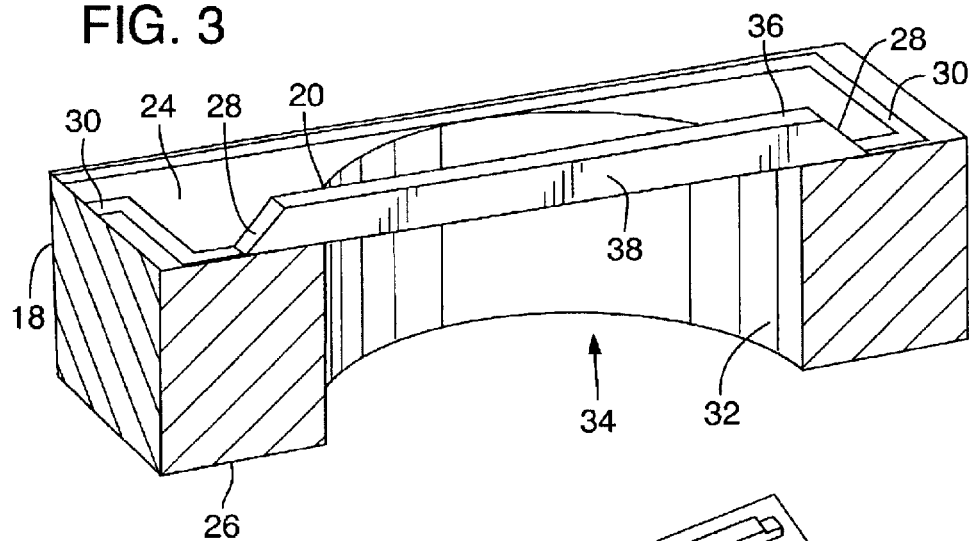
FIG. 3 is a cross-sectional isometric view of the detector array of FIG. 1, showing a single thermal-sensitive element disposed on a monolithic substrate.

Referring now particularly to FIG. 3, a single detector is shown in cross-section so as to demonstrate operation thereof. As indicated, the illustrated detector 20 includes a thermal-sensitive element 36, which typically is formed of a metal or other conductive material capable of dissipating heat. Thermal-sensitive element 36 thus may take the form of a resister, or a transistor, with a pair of terminals 28, electrically coupled with an interconnection arrangement, such as conductive paths 30. Paths 30, it will be understood, may in turn be connected to a control circuit as will be described further below.

As shown, base 18 typically defines a cavity or hole 32, defining an open space 34, and thermal-sensitive element 36 includes a spanning portion 38 adjacent the open space and in fluid communication with the open space. That is, the fluid in channel 12 is free to flow within cavity 32 and around spanning portion 38 of thermal-sensitive element 36. Spanning portion 38 is therefore generally uncoupled thermally from the thermal mass of base 18.

If surface 24 is considered an upper surface, it may be seen that spanning portion 38 is suspended over a void. As will be appreciated by those of skill in the art, open space or void 34 may be created by various techniques, including those available in integrated circuit manufacturing, such as masking and/or etching, or any other suitable material removal process, including without limitation, laser ablation or sand blasting. Furthermore, although a circular through-hole is shown in FIG. 3, cavity 32 need not necessarily extend entirely through base 18, and may extend only part way into base 18 and may be of virtually any shape.

It will be appreciated by those of skill in the art that an electrical signal can be derived from each thermal-sensitive element by a variety of techniques. For example, each thermal-sensitive element 36 may be connected by paths 30 to place thermal-sensitive element 36 in a circuit, such as in a leg of Wheatstone bridge, in which case a compensation resistor for each bridge may also be located on the substrate and appropriately coupled in the circuit. In the Wheatstone bridge, the signal is the heating current that is required to maintain the thermal-sensitive element at the same temperature and resistance as the compensation resistor, the heating current typically being measured by measuring the voltage across a resistor in series with the thermal-sensitive element. A variety of other circuits can be used to derive a signal from each thermal-sensitive element that indicates the fluid flow at each thermal-sensitive element.

Figure 7:
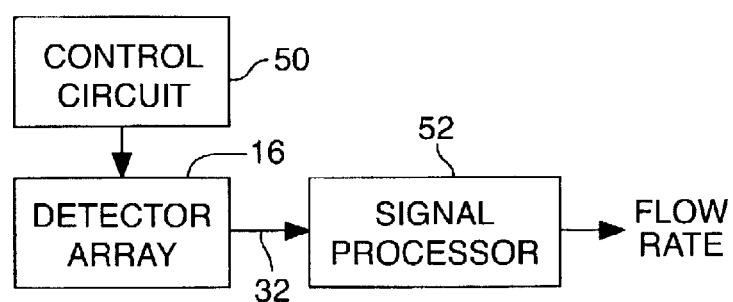
FIG. 7 is a block diagram showing interconnection between a detector array, a control circuit for providing heating and sensing power to the detector array, and a signal processor for processing signals from the detector array to calculate fluid flow rate.

FIG. 7 shows a block diagram of typical interconnections for an embodiment of the present invention. A control circuit 50 may be coupled to detector array 16, providing heating current directly to the thermal-sensitive elements, or to separate heating elements which in turn heat the thermal-sensitive elements above ambient. The thermal sensitive elements in detector array 16 then may provide signals 32 to a signal processor 52. Signals 32 may be the heating currents as measured by voltages at resistors in series with each thermal-sensitive elements, as described above, or may be other suitable signals indicative of the temperature of each thermal-sensitive element in response to the combined effect of heating above ambient and cooling by the fluid flow.

Each thermal-sensitive element may reflect a different degree of cooling by the fluid flow, depending on the position of the thermal-sensitive element in array 16 with respect to the fluid channel and to other thermal-sensitive elements. Each element thus may provide a signal different in value from the signals from the other elements. Typically at least one thermal-sensitive element is set up as a reference detector by being positioned so as not to be cooled by the fluid flow, by being placed sufficiently close to the side wall of the channel or by being insulated from the fluid flow, e.g., by conformal coating or by being embedded within the wall of the channel. Signal processor 52 receives the signal from the reference detector and the other signals, and may compare them, and then may average or otherwise evaluate and analyze the signals to produce a flow rate for the fluid channel as a whole.

The reference thermal-sensitive elements may be either raised above ambient to the same degree as for the thermal-sensitive elements in the flow, or left at ambient temperature. In either case, the reference thermal-sensitive elements provide signals that may be compared to the signals from the thermal-sensitive elements in the flow to calculate the flow rate at any ambient temperature. The signals from the reference thermal-sensitive elements are substantially unmodified by the fluid flow. Alternatively, the thermal-sensitive elements in the flow may be tested in a zero-flow condition to provide a reference temperature.

In one embodiment, the flow rate may be calculated from an average temperature differential ($T_{diff}$) between one or more reference thermal-sensitive elements and one or more thermal-sensitive elements in the flow. Such average temperature differential ($T_{diff}$) may be calculated as the difference between the average temperature of the thermal-sensitive elements in the flow ($T_{flow}$) and the average temperature of the reference thermal-sensitive elements ($T_{ref}$). $T_{diff}$ thus typically has greater accuracy for determining the flow rate for the fluid channel than would the temperature differential between an individual thermal-sensitive elements in the flow and a reference thermal-sensitive elements. This averaging corrects both for process variations and other inaccuracies of individual thermal-sensitive elements, as well as for variations in the flow rate between the boundary layer and the free stream. Additionally, other signal processing techniques may be employed on the information available from the multiple sensors to characterize the fluid flow in the channel and arrive at the flow rate.

Figure 4:
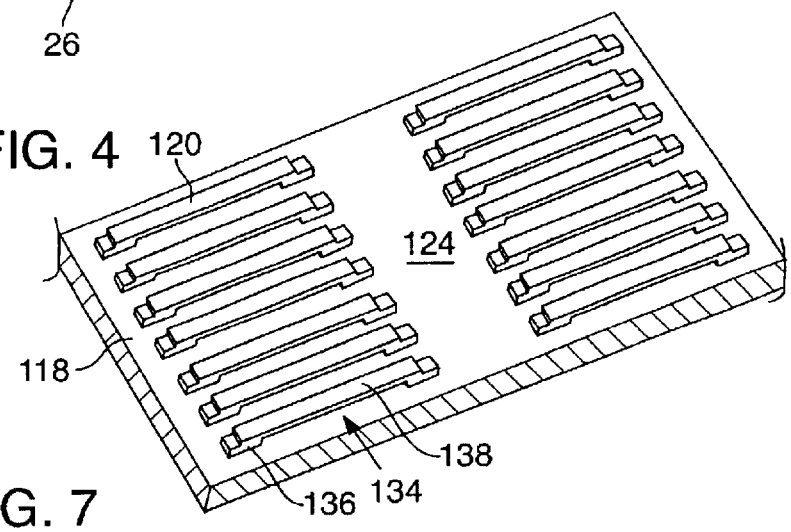
FIG. 4 is a cross-sectional isometric view of a detector array in accordance with another embodiment of the invention.

FIG. 4 shows a base 118 which carries an alternative detector array configuration. As indicated, detectors 120 may be more closely spaced along the channel to further promote detection of the fluid flow direction. Furthermore, although not depicted, base 118 may define cavities or holes beneath each detector, created by etching or other techniques, to thermally uncouple such detectors from base 118. As shown, the detectors may include respective thermal-sensitive elements 136, each with a spanning portion 138 raised above a surface 124 of the base so as to allow fluid flow around the thermal-sensitive elements 136 through an open space 134.

As may be seen in FIG. 1, detector array 16 includes a plurality of rows of detectors that are generally perpendicular to the channel axis. For example, each of detectors 20 closest to an edge 40 of base 18 form one such row, and likewise for detectors 20 closest to an edge 42, and such rows are substantially perpendicular to axis A. Such rows preferably include a detector adjacent side wall 14 of channel 12, a plurality of detectors extending in a row from the side wall, each detector in the row closer to the channel axis than the preceding detector, and a detector adjacent the channel axis.

As shown in FIG. 5, base 18 may be disposed in channel 12 with planar surface 24 (FIG. 6) substantially perpendicular to channel axis A. Preferably in this configuration, cavities 34 (FIG. 6) are through-holes to allow fluid to flow therethrough. As for FIG. 1, base 18 and detectors 20 are depicted, for clarity, as larger relative to the channel than would be the case for an actual sensor. In general, base 18 will be small enough to have substantially no effect on the fluid flow. Detectors 20 may be seen to be arranged substantially in rows across channel 12, substantially in a grid pattern. Each of the detectors in a row are generally in a linear relationship with respect to one another, while the detectors not in a particular row are placed generally orthogonally with respect to that row.

Figure 6:
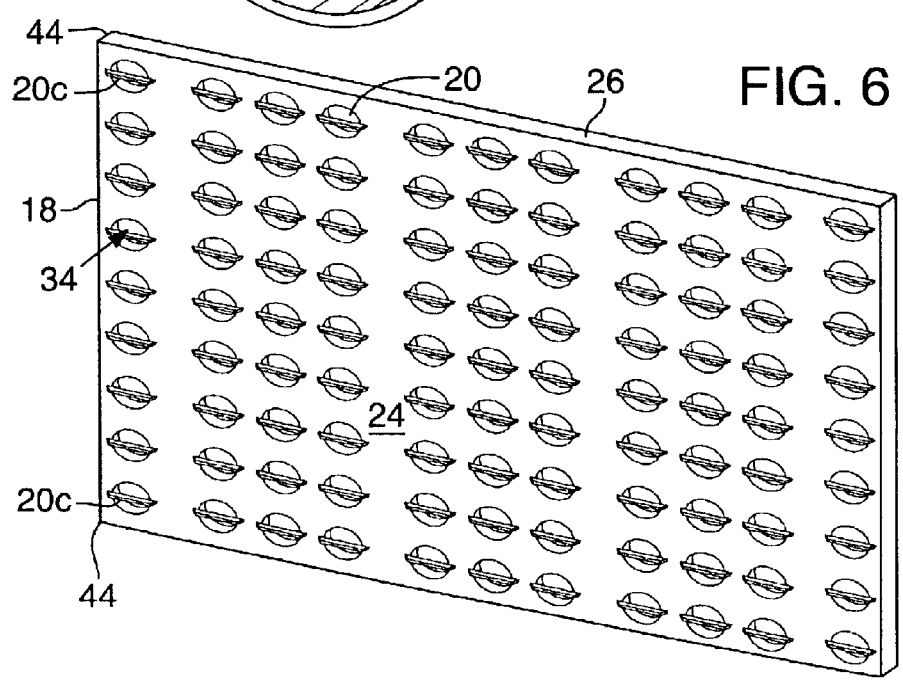
FIG. 6 is an enlarged isometric view of the detector array of FIG. 5.

As shown in FIGS. 5 and 6, base 18 preferably includes two corners 44 that are butted against inner wall 14 of channel 12. Detectors 20c located in corners 44 may be located sufficiently close to inner wall 14 so as to be in a portion of the boundary layer where the flow rate is effectively zero. In this configuration, detectors 20c produce signals 32 that are substantially unmodified by the fluid flow, and thus detectors 20c may serve as reference detectors. Reference detectors may alternatively be coated or otherwise insulated from the effect of the fluid flow. Detectors 20 that are in the flow provide signals as described above for FIG. 1 whereby the fluid flow may be characterized in the boundary layer and the free stream, and a flow rate for channel 12 may be calculated using averaging or other signal processing techniques.

The subject matter described herein includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements. It is believed that the following claims particularly point out certain combinations and subcombinations that are directed to one of the disclosed embodiments and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the present disclosure.

What is claimed is:

1. A flow sensor system for measuring the rate of flow of a fluid, the system comprising:

a flow channel configured to contain the fluid flow, wherein the flow channel includes at least one side wall, and wherein the flow channel defines a central longitudinal axis, a boundary region and a free stream region, a monolithic substrate providing a plurality of paths, each path conducting a signal, the substrate disposed in the flow channel;

a plurality of transducers disposed on the substrate in the flow channel, the transducers configured to respond to the fluid flow by modifying the signals in relation to the fluid flow, the transducers arranged with at least one of the transducers disposed closer to the central axis than at least one other transducer, at least one transducer disposed on the substrate in the free stream region and a signal processor coupled to at least two of the signals, the signal processor calculating the rate of flow of the fluid as a function of the at least two signals.

2. The flow sensor system of claim 1, wherein the signal processor is further configured to determine flow direction based on a differential heat-dissipative effect of the transducers disposed on the substrate.

3. The flow sensor system of claim 1, wherein the substrate includes a cavity defining an open space, and at least one of the transducers is disposed on the substrate with at least a portion of the transducer adjacent the open space, the portion in fluid communication with the open space.

4. The flow sensor system of claim 1, wherein the substrate includes a generally planar surface, and at least one of the transducers is disposed on the planar surface, the substrate disposed in the channel with the planar surface generally parallel to the channel axis.

5. The flow sensor system of claim 4, wherein the substrate includes a void, and at least one of the transducers is disposed on the substrate surface with at least a portion of the transducer suspended over the void.

6. The flow sensor system of claim 5, wherein the substrate includes a second surface opposite the planar surface, and the void is a hole defined through the substrate from the planar surface to the opposite surface.

7. The flow sensor system of claim 1, wherein at least two of the transducers are disposed substantially in a row, wherein the row is generally perpendicular to the channel axis.

8. The flow sensor system of claim 7, wherein the row of at least two transducers includes at least one transducer adjacent the channel axis.

9. The flow sensor system of claim 1, wherein the transducers are disposed with a first one of the transducers adjacent the side wall, a second one of the transducer closer to th channel axis than the first transducer, and a third one of the transducers closer to the channel axis than the second transducers.

10. The flow sensor system of claim 1, further including a reference transducer disposed on the substrate, the reference transducer located in the channel sufficiently close to a side wall of the channel that the reference transducer produces a signal that is substantially unmodified by the fluid flow.

11. The flow sensor system of claim 1, further including a reference transducer disposed on the substrate, the reference transducer substantially insulated from the fluid flow.

12. The flow sensor system of claim 1, wherein at least one of the transducers is tested in a zero-flow condition to provide a reference.

13. The flow sensor system of claim 1, wherein the substrate includes a generally planar surface, and at least one of the transducers are disposed on the planar surface, the substrate disposed in the channel with the planar surface substantially perpendicular to the channel axis.

14. The flow sensor system of claim 13, wherein the substrate includes a cavity defining an open space, and at least one of the transducers is disposed on the substrate surface with at least a portion of the transducer adjacent the open space, the portion in fluid communication with the open space.

15. The flow sensor system of claim 14, wherein the substrate includes a second surface opposite the planar surface, and the cavity extends from the planar surface to the opposite surface.

16. A detector array for calculating the rate of flow of a fluid in a channel, the detector array comprising:
 a plurality of thermal-sensitive elements configured to be disposed within the channel, the elements coupled to an electrical power source for heating above an ambient temperature, each element configured to modulate a signal in response to the fluid flow, wherein the channel defines a boundary region and a free stream region, and wherein at least one thermal-sensitive element is disposed in the free stream region; and
 a signal processor coupled to the thermal sensitive elements, the signal processor receiving the signals and calculating an average from the signals to indicate the rate of the fluid flow in the channel.

17. The detector array of claim 16, wherein the signal processor is further configured to determine flow direction based on a differential heat-dissipative effect of the thermal-sensitive elements.

18. The detector array of claim 16 for use in the channel, where the channel defines a central longitudinal axis, wherein the thermal-sensitive elements are configured to be arranged in the channel with at least one of the elements disposed closer to the central axis than at least one other element.

19. The detector array of claim 16, further comprising a substrate configured to be disposed within the channel, the substrate providing a generally planar surface for supporting at least one of the thermal-sensitive elements.

20. The detector array of claim 19, wherein the substrate includes a void, and at least one of the thermal-sensitive elements is disposed on the substrate surface with at least a portion of the thermal-sensitive elements suspended over the void.

21. The detector array of claim 20, wherein the substrate includes a second surface opposite the planar surface, and the void is a hole defined through the substrate from the planar surface to the second surface.

22. The detector array of claim 19, further including a reference element disposed on the substrate, the reference element substantially insulated from the fluid flow.

23. A thermal flow sensor for detecting a flow of a fluid, the sensor comprising:
 a substrate including an interconnection to convey a signal indicative of the fluid flow, the substrate further including a cavity defining an open space, and
 a first thermal-sensitive element disposed on the substrate and coupled to the interconnection, the element including at least a portion disposed adjacent the cavity, the portion in fluid communication with the open space, the element coupled to the interconnection, the element configured to react to the fluid to modify the signal,
 wherein the substrate defines a first surface and an opposite second surface, and wherein the open space is a hole defined through the substrate from the first surface through to the second surface.

24. The thermal flow sensor of claim 23, further comprising a second thermal sensitive element disposed on the substrate, the second element spatially separated from the first element.

25. The thermal flow sensor of claim 24, further comprising a signal processor coupled to the thermal-sensitive elements, the signal processor calculating a rate of flow of the fluid.

26. The thermal flow sensor of claim 24, further comprising a signal processor coupled to the thermal-sensitive elements, the signal processor being configured to determine flow direction based on a differential heat-dissipative effect of such thermal-sensitive elements.

27. The thermal flow sensor of claim 23, further comprising at least a second and a third thermal-sensitive element disposed on the substrate, the at least three thermal-sensitive elements spatially separated from one another and arranged generally in a linear relationship on the substrate.

28. The thermal flow sensor of claim 27, further comprising at least a fourth thermal-sensitive element disposed on the substrate, the fourth thermal-sensitive element placed outside the generally linear relationship of the first, second, and third elements.

29. The thermal flow sensor of claim 23, further comprising a plurality of additional thermal-sensitive elements disposed on the substrate, the first and additional thermal-sensitive elements arranged substantially in a grid pattern.

30. A thermal flow sensor for detecting a flow of a fluid, the sensor comprising:
 a base configured to be mounted with at least one surface in the flow, the base providing at least one interconnection to convey a signal indicative of the fluid flow and to couple to an electrical power sours for heating, the base further including a void configured to allow the fluid to flow therein, and
 a first and a second thermal-sensitive element disposed on the base, the second element spatially separated from the first element, each of the elements coupled to the at least one interconnection, each of the elements including at least a portion suspended over the void, each of the elements configured to be heated by the electrical power source and configured to modify the signal in response to a thermal change induced by the fluid flow.

31. The thermal flow sensor of claim 30, further comprising a signal processor coupled to the thermal-sensitive elements, the signal processor calculating a rate of flow of the fluid.

32. The thermal flow sensor of claim 30, further comprising a signal processor coupled to the thermal-sensitive elements, the signal processor being configured to determine flow direction based on a differential heat-dissipative effect of such thermal-sensitive elements.

33. The thermal flow sensor of claim 30, wherein the base defines a first surface and an opposite second surface, and wherein the cavity is defined from the first surface through to the second surface.

34. The thermal flow sensor of claim 30, further comprising at least a third thermal-sensitive element disposed on the base, the at least three thermal-sensitive elements spatially separated from one another and arranged generally in a linear relationship with respect to one another.

35. The thermal flow sensor of claim 34, further comprising at least a fourth thermal-sensitive element disposed on the base, the fourth thermal-sensitive element placed generally orthogonally with respect to the generally linear relationship of the first, second, and third elements.

36. The thermal flow sensor of claim at 30, further comprising a plurality of additional thermal-sensitive elements disposed on the base, the first and additional thermal-sensitive elements arranged substantially in a grid pattern.

37. A thermal flow sensor system for calculating a rate of flow of a fluid, the system comprising:
  a flow channel configured to contain the fluid flow, the flow channel defining a central longitudinal axis, a boundary region and a free stream region,
  a plurality of means for measuring a temperature within the flow, the temperature-measuring means disposed within the channel with at least one of the means located closer than at least one other of the means to the axis of the channel and with at least one of the means located in the free stream region, each of the means producing a signal indicative of the temperature of the means,
  a signal processor coupled to the temperature-measuring means, the signal processor receiving the signals and calculating the rate of flow of the fluid from the signals.

38. The flow sensor system of claim 37, wherein th signal processor is further configured to determine flow direction based on a differential heat-dissipative effect of the temperature-measuring means.

39. The detector array of claim 37, further comprising a substrate configured to be disposed within the channel, the substrate providing a generally planar surface for supporting at least one of the temperature-measuring means.

40. The detector array of claim 39, wherein the substrate includes a void, and at least one of the temperature-measuring means is disposed on the substrate surface with at least a portion of the means suspended over the void.

41. The detector array of claim 40, wherein the substrate includes a second surface opposite the planar surface, end the void is a hole defined through the substrate from the planar surface to the opposite surface.

42. The detector array of claim 37, further including a means for measuring a reference temperature, the reference-temperature-measuring means substantially insulated from the fluid flow.

43. A method for creating a thermal detector array on a substrate, the method comprising the steps of:
  depositing a plurality of thermal-sensitive elements on the substrate and providing a plurality of conductive signal paths coupled to the thermal-sensitive elements; and
  creating a plurality of cavities in the substrate, each cavity defining an open space in the substrate adjacent at least one of the thermal-sensitive elements, each thermal-sensitive element including a portion suspended over the open space, wherein the substrate includes a first generally planar surface, and a second generally planar surface opposite the first surface, wherein the plurality of cavities are holes defined through the substrate from the first surface to the second surface.

44. The method of claim 43, a wherein the cavities are generally cylindrical.

45. The method of claim 43, wherein the cavities are created by etching.

46. The method of claim 43, wherein the cavities are created by laser ablation.

47. The method of claim 43, wherein the cavities are created by sand blasting.

* * * * *

UNITED STATES PATENT AND TRADEMARK OFFICE
CERTIFICATE OF CORRECTION

PATENT NO. : 6,796,172 B2
DATED : September 28, 2004
INVENTOR(S) : Blakley et al.

It is certified that error appears in the above-identified patent and that said Letters Patent is hereby corrected as shown below:

Column 10,
Line 34, delete "sours" and insert therefor -- source --.

Column 12,
Line 2, delete "end" and insert therefor -- and --.

Signed and Sealed this

Fifth Day of April, 2005

JON W. DUDAS
*Director of the United States Patent and Trademark Office*